Oct. 22, 1929. J. A. R. BENNET 1,732,631
LATHE FOR TURNING PISTON RINGS
Original Filed Jan. 14, 1922

Inventor
J. A. R. Bennet

Atty

Patented Oct. 22, 1929

1,732,631

UNITED STATES PATENT OFFICE

JULES AXEL RUTGER BENNET, OF LANDSKRONA, SWEDEN

LATHE FOR TURNING PISTON RINGS

Original application filed January 14, 1922, Serial No. 529,276, and in Sweden August 20, 1921. Divided and this application filed August 7, 1923. Serial No. 656,205.

This invention relates to improvements in the manufacture of piston rings and this case is a division of my application, Serial No. 529,276, filed January 14, 1922. The invention refers more particularly to an improved method and apparatus for the production of such rings. In order to procure perfect tightness between the piston and the cylinder wall it is an indispensable condition that the piston ring or rings perfectly rest against the cylinder wall in such a way that the fluid in no place can pass between said members. For this purpose the ring must have a correct shape when in a free state and it must also be elastic so that a certain pressure is exerted by the ring upon the cylinder wall, and this pressure ought to be uniformly distributed along the whole circumference.

Whatever may be the nature of the ring in other respects, it is necessary for obtaining a perfect tightness, that it assumes a perfectly circular form by its own tension, when it is put into its place and exposed to the forces acting upon the same, but this does not mean that the ring has had a circular shape once during the manufacture of the same. Amongst all piston rings and methods of manufacturing such rings hitherto known none is to be found that fulfills the above main conditions for effective tightening.

After the ring has been split it must not be exposed to any treatment apt to substantially strain the material, and therefore no turning is to be allowed—at most a grinding after the splitting. If the ring, therefore, nevertheless is going to assume a circular shape after it has been split and put into its place in the piston and the cylinder, it must already from the very beginning be turned into such a shape that it assumes a circular form when put into its place.

Different ways have been proposed for obtaining the desired result. It has, for instance, been proposed that the elastic piston ring, in order to exert a uniform pressure on the cylinder wall, in a free state must assume the form of "a peculiar curve" that can be obtained, if a distance piece is inserted in the joint of a split, circular ring without any internal stresses whatever and the ring in this way is forced apart. It is true that this theory at a cursory glance seems to be quite correct, but at a closer examination of all the cooperating factors it is obvious that there is no guarantee at all that a ring forming a true copy of the originally circular ring after providing the same with a distance piece inserted in the joint, will assume a circular form and exert a pressure uniformly distributed along the whole circumference, after such ring has been split and compressed to the diameter of the cylinder. It has not been proved that this will be the case and certainly it is impossible to prove such a thing. It has even been stated that "the peculiar curve" should correspond to the involute of a cycloid considered as evolute and generated by a circle having a diameter proportional to the pressure to be exerted by the ring, but no real support for such an assumption is to be found. On the contrary, it can be theoretically proved that this curve does not coincide with the correct one. If piston rings are manufactured somehow or other by using the said peculiar curve as a former or template it will be found that they do not fulfil the requirements given above.

According to the present invention the radius of curvature of the curve formed by the ring in a free state may be determined easily and accurately in each separate point to make the ring inserted in the cylinder assume a circular form and to exert a uniform pressure along the whole circumference.

The invention is illustrated in the accompanying drawing in which—

Supposing that—

$r_1$ = the radius of curvature of the middle line of the ring in a free state at an arbitrary section of the same.

$r$ = the radius of curvature at the same place of the middle line of the ring when inserted into its place in the cylinder.

$M$ = the bending moment acting upon the ring in the said section, $\Theta$ = the moment of inertia in the same section, $\alpha$=the modulus of elasticity for tension of the ring material, and the height of the section is small compared with the radius of curvature, the following equation is applicable:

$$\frac{1}{r} = \frac{1}{r_1} + \alpha \frac{M}{\theta}.$$

Figure 1:
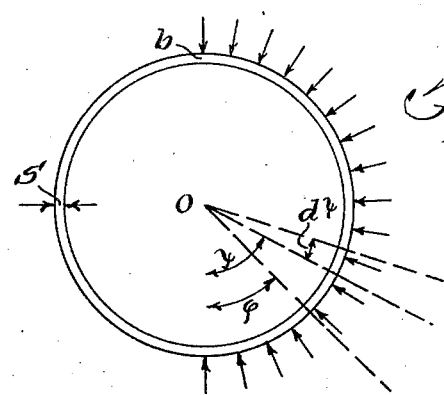
Fig. 1 shows a piston ring split at $b$.

On the presumption that the elasticity of the ring outwards in all places is going to have one and the same value $p$, and that the thickness of the ring is so small in relation to $r$ that $r$ may be considered as equivalent to the radius of the cylinder bore the following formula will be obtained for the section determined by the angle $\phi$ at the centre (Fig. 1):

$$M = \int_\phi^\pi p.h.r.r \sin(\psi - \phi) d\psi = p.h.r^2(1 + \cos \phi),$$

wherein $h$=the height of the ring. By inserting this value in the preceding equation and with $\theta = \frac{1}{12} h s^3$ is obtained:

$$r_1 = \frac{S^3 r}{S^3 - 12 p.r^3.\alpha(1 + \cos \phi)},$$

which indicates the radius of curvature that the curve formed by the ring in a free state ought to have in each point, in order that the ring in its proper place in the cylinder may assume a circular form.

Be it noticed that this radius of curvature is not to be mistaken for the distance of the point in question from 0. This distance may be determined for each point from the equation obtained by the integration of the following differential equation:

$$\frac{\frac{d^2 y}{dx^2}}{\left[1 + \left(\frac{dy}{dx}\right)^2\right]^{3/2}} = \frac{S^3 - 12 p.r^3.\alpha \left(1 + \frac{X}{\sqrt{x^2 + y^2}}\right)}{S^3.r}$$

In this way it will be possible to construct a curve that answers the requirements, whereafter a plate or a template 1 (Fig. 1) is produced having its circumference point after point determined by the following formula:

$$R\phi = R\pi + a(S\phi - S\pi),$$

in which—

$R\phi$ indicates the radius of the template in an arbitrary point, i.e. the distance between such a point and the origin, $R\pi$=the shortest radius of the template, which may be chosen as large as the dimensions of the lathe admit in order to obtain as accurate a result as possible.

$a$=a coefficient expressing a relation on which the accuracy also is dependent in such a way that the latter increase with $a$, $S\phi$=the radius of the piston ring in a point corresponding to $R\phi$ (calculated according to the formula given above), $S\pi$=the shortest radius of the piston ring, which is the same as the radius of the cylinder bore.

It is to be remembered that here the word radius is not to be understood as radius of curvature but as the distance of the point in question from 0.

As soon as $a$ once has been determined for a certain ring this ratio may be determined for any other ring by the formula:

$$a = \frac{R\phi - R\pi}{S\phi - S\pi},$$

wherein $S\phi$ is obtained from the properties to be given the ring. Thus it will be seen that only a variation of $a$ is needed in order to produce any ring by means of the same template. The method of carrying out this mechanically will appear from the following description.

The template 1 is mounted on a face plate or the like in a lathe in such a way that the point 0 coincides with the axis of rotation of the spindle. A bracket 3 carrying a roller 4 is supported by the main saddle 2. A cord 5 running over said roller 4 is at one end connected with the cross slide 6 and at its other end provided with a weight 7. At the side of the main saddle 2 opposite the roller 4 a lever 9 is pivoted on a horizontal shaft 8, said lever being directed upwards and at its upper end provided with a roller 10 on a level with the spindle or with the point 0 on the template 1. A sleeve 11 is provided on the lever 9 and made to slide along the same. The sleeve 11 is arranged to be locked to the lever in different positions along a scale 12 on the lever. The sleeve 11 is also provided with a journal 13 extending horizontally from the same and parallel to the shaft 8 in the saddle. The journal 13 is pressed towards the spindle of the lathe by means of a surface 14 on the cross slide in such a way that the roller 10 is pressed against the circumference of the template 1. At the rotation of the latter, therefore, the cross slide 6 will be moved backwards and forwards according as the roller 10 passes points on the circumference of the template situated at a shorter or longer distance from the axis of rotation. It is obvious that the top slide carrying the tool holder takes part in this movement backwards and forwards causing the piston ring 15 carried by the face plate to be turned off in such a way that it will be given the theoretically correct form. When the difference between the longest and shortest distance from the circumference of the template to the point 0 is known, any desired difference between the corresponding distances on the piston ring 15 may be obtained by different adjustments of the sleeve 11 along the lever 9. If for instance the sleeve 11, as shown in the drawing is adjusted in such a way that the distance between the axis of the roller 10 and the axis of the shaft 8 is five times as long as the distance between the latter and the journal 13, i. e. if the ratio of the leverage is 5:1, it is obvious that the difference between the longest and shortest distance from the circumference of the template to the point 0 is in a ratio to the difference between the corresponding distances on the turned piston ring as 5:1, and this ratio is the same as $a$.

By means of the apparatus described above it is thus possible to manufacture piston rings of any dimensions using one and the same template and with any desired difference between the longest and shortest distance to the central point 0, which difference determines the tension of the ring.

It is true that it has previously been proposed to produce piston rings of a certain form, but no practical results have been arrived at, as it has been impossible to make rings for different cylinder dimensions and for each such a dimension having the desired tension by means of one and the same template, which is accomplished by the present invention.

Figure 2:
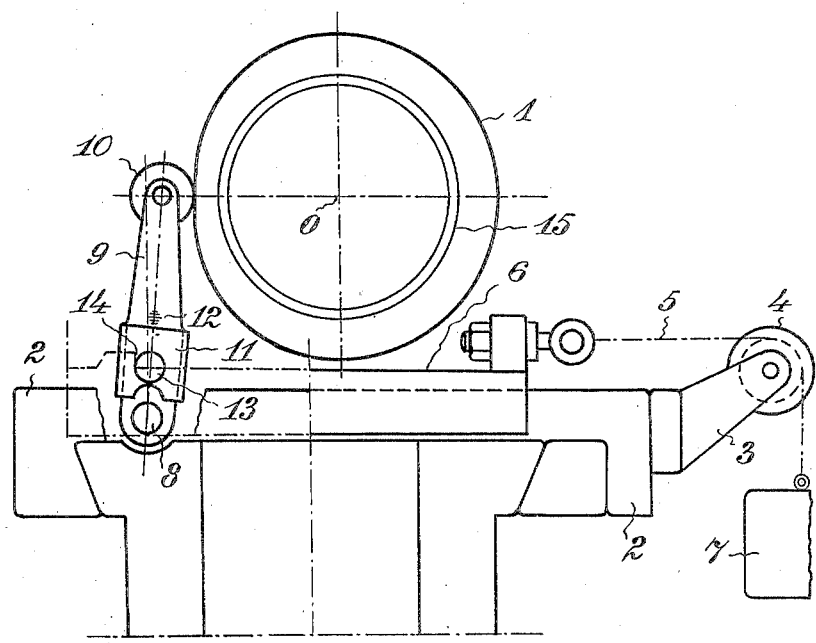
Fig. 2 is a diagrammatic view of an arrangement for carrying out the process.

The apparatus shown in Fig. 2 for the manufacturing of piston rings is only intended to illustrate in what manner the invention may be performed in a simple way, and obviously the apparatus may be varied in different ways without digressing from the principle of the invention.

Having thus described my invention what I claim and desire to secure by Letters Patent is:—

1. An apparatus for the manufacture of piston rings including a lathe structure having a main saddle and a cross slide of a template mounted in the lathe for rotation, a lever pivotally supported at one end in the main saddle, a roller carried by the free end of the lever and serving in operation to bear against the surface of the template to cause the lever to be operated in accordance with the curvature of the template, a sleeve encircling and adjustable longitudinally of the lever and carrying a pin to bear against a shoulder formed on the cross slide, and means to operate the cross slide in opposition to the action of the lever, and scale markings on the face of the lever with which one edge of the sleeve may cooperate to determine the adjustable set of the sleeve relative to the free end of the lever, the adjustment of the sleeve permitting the turning of piston rings of different diameters with their curvature controlled by the same template.

2. An apparatus for the manufacture of piston rings, comprising a spindle, a saddle, a cross slide mounted on said saddle for reciprocatory movement and carrying a cutting tool, a cam template of suitable curvature secured on said spindle, and means for moving said cross slide in proportion to the difference between the radius vectors of said cam template and the smallest radius vector of said cam template.

3. In a lathe, a saddle, a cross slide mounted on said saddle for reciprocatory movement, a spindle, a cam template mounted on said spindle, a lever pivoted on said saddle and bearing against said template, a slide control member adjustably positioned on said lever, and means whereby said slide control member moves said cross slide in accordance with movement of said lever.

4. In a lathe, a saddle, a cross slide mounted on said saddle for reciprocatory movement, a spindle, a cam template mounted on said spindle, a lever pivoted on said saddle and bearing against said template, means for moving said cross slide in accordance with oscillation of said lever, and means for changing the range of movement of said cross slide with respect to range of movement of said lever.

In testimony whereof, I have signed my name to this specification.

JULES AXEL RUTGER BENNET.